United States Patent Office 3,027,888
Patented Apr. 3, 1962

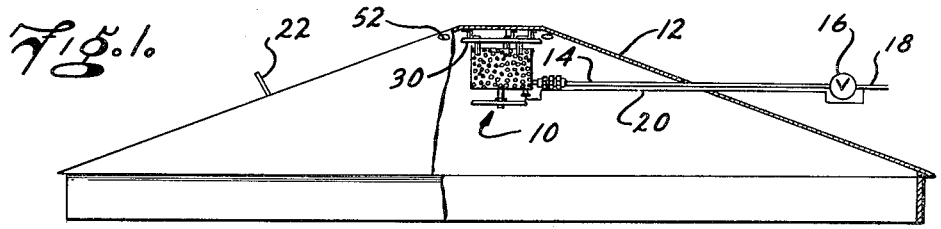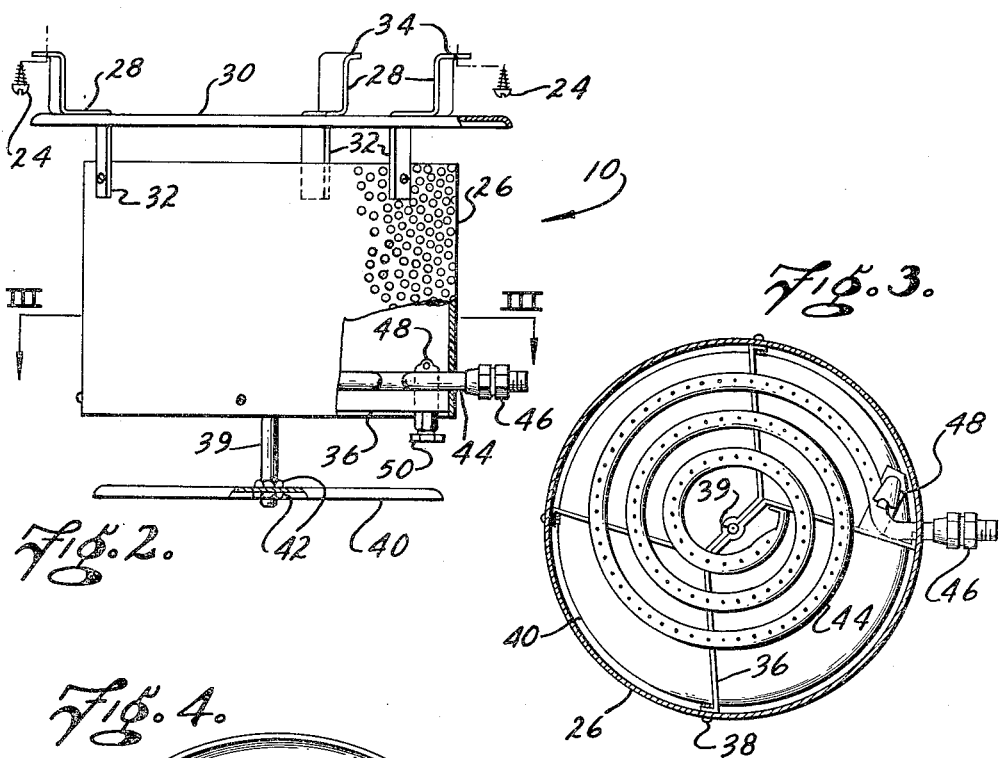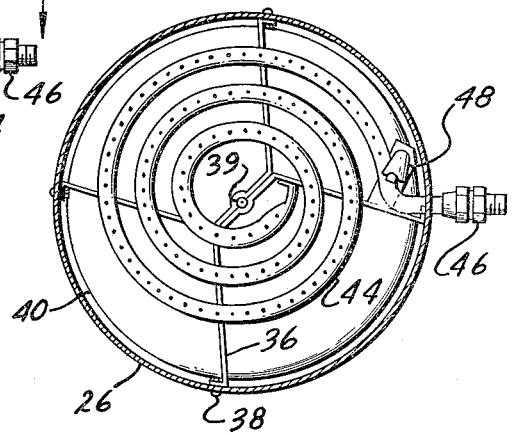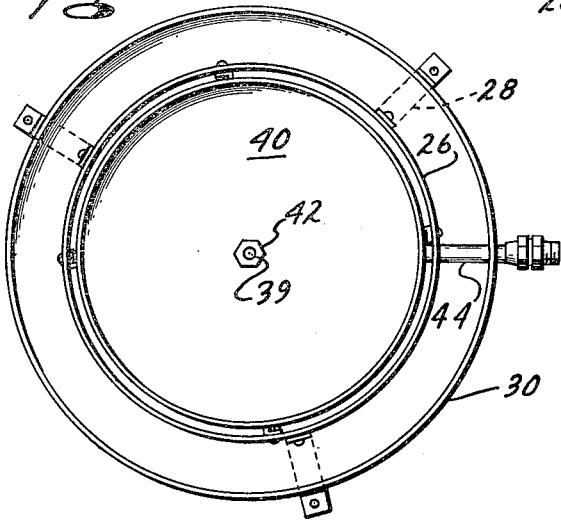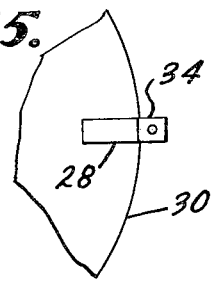

3,027,888
POULTRY BROODERS
Homer D. Du Fault, Easthampton, and William J. Kuhn, Springfield, Mass., assignors to Heatbath Manufacturing Company, Inc., Indian Orchard, Mass., a corporation of Massachusetts
Filed Dec. 21, 1959, Ser. No. 860,991
2 Claims. (Cl. 126—85)

The present invention relates to improvements in poultry brooders or the like and more particularly to improved heater means therefor.

The overall object of the invention is to improve and simplify the heating of poultry brooders from the standpoint of manufacture as well as use.

A more specific object is to minimize, if not eliminate, the hazard of foreign matter passing over the burner flame inside the brooder and the consequent dangers resulting therefrom.

Another object of the invention is to provide a more even heat distribution from the unit employed in heating the brooder.

Still another object of the invention is to supply a fuel burner with a very low minimum flame thus giving a wider range of operation in order to maintain more even temperatures.

Yet another object of the invention is to eliminate the burning out of metal parts used in heaters of poultry brooders as well as the burning out of metal portions of a brooder itself.

A further object of the invention is to provide increased efficiency in using the potential heat from gas fuel.

The inventive concepts of the present invention are to be found in a poultry brooder heater characterized by top and bottom deflector plates spaced respectively above and below an openwork or perforated metal housing. A gas burner is mounted within the housing. Other characterizing features of the invention are found in the use of a non-aerated burner, also known as luminous flame or yellow flame burner, for heating the brooder, and a compact "pre-packaged" burner unit essentially fool-proof both in installation and use. Additionally there is provided an improved venting arrangement for the products of combustion of said heater.

The above and other related objects and features of the invention will be apparent from a reading of the following description of the disclosure found in the accompanying drawing and the novelty thereof pointed out in the appended claims.

In the drawing:
FIG. 1 is a section, on a reduced scale, through a poultry brooder showing the present heater unit installed for operation;
FIG. 2 is an elevation, partly in section, of the heater unit alone;
FIG. 3 is a section taken on line III—III in FIG. 2;
FIG. 4 is a bottom view of the heater unit; and
FIG. 5 is a fragmentary plan view.

Referring first to FIG. 1, there is seen a poultry brooder having a conical roof 12 which may be fabricated in accordance with known techniques. A heater unit 10 is attached to the roof 12 of the brooder and is spaced above the poultry, as young chicks, so that direct contact will not be normally possible. A pipe 14 is connected to the heater unit 10 and extends to a valve 16 mounted on the outside of the brooder. A pipe 18 extends to a suitable source of fuel gas preferably at customary domestic delivery or normal "bottled" gas pressures. A tube 20 extends from the heated unit 10 to the pipe 18 to provide fuel for a pilot light while gas flows through the pipe 14 to the main burner of the heater unit. A thermometer 22 is mounted in the roof of the brooder so that the interior temperature of the brooder may be read from the outside. The valve 16 is preferably controlled by a thermostat (not shown) inside the brooder in a known manner. The flow of gas to the heater unit is thus controlled to obtain the desired brooder temperature.

Referring now to FIGS. 2–6, it will be appreciated that the heater unit 10 is a "pre-packaged" assembly requiring only the use of a simple attaching means, shown here as the screws 24, and the attachment of pipe 14 and tube 20 to complete the installation in a brooder.

The heater unit 10 comprises an openwork, perforated sheet metal housing 26. Three brackets 28 are secured to a top deflector plate 30 and have depending portions 32, projecting through the plate, which are secured to the housing 26 and space the plate 30 thereabove. The brackets 28 also have upper angle portions 34 through which the screws 24 project in securing the heater unit to the brooder. The angle portions 34 also space the plate 30 from the roof 12 of the brooder.

Adjacent the lower end of the housing 26, a spider 36 is secured in place by screws 38. A rod 39 is secured to and depends from the center of the spider 36. A lower bottom deflector plate 40 is mounted on the rod 39. The rod 39 is threaded so that nuts 42 may be applied to position the plate 40 at a desired predetermined distance below the housing 26.

The spider 36 supports a spirally wound tube 44 (FIG. 3) which is sealed off at its inner end and provided at its outer end with an appropriate fitting 46 for making a connection with the pipe 14. Gas outlets are provided along the length of the spirally wound portion of the tube 44 which thus constitutes the burner element of the heater unit. It will be apparent that this is a non-aerated or luminous flame burner wherein "primary" air is not mixed with the gas and combustion is supported solely by "secondary" air. The purpose of the metal plate 40 below the burner element is to prevent high floor temperatures under the unit and in order to maintain more even temperatures at floor level. The plate 40 below the burner is properly set for sufficient secondary air to be admitted to the burner flames. The threading for the nuts 42 is restricted to admit only the desired positioning or the plate may be otherwise fixed on the stem.

A pilot burner 48 is also mounted on the spider 36 and has a fitting 50 for making a connection with the tube 20. In operation the pilot burner 48 is normally lit at all times. The main burner 44 will be turned on by operation of the thermostatic controlled valve 16.

It has been found that the radiant qualities of the luminous flame type of burner, and particularly the described spiral configuration thereof, give a maximum heat output from a unit occupying a minimum of space. Further, these radiant qualities are highly effective in spreading the heat over a large area. Also, there is less concentration of heat which would tend to burn out the metal parts of the heater and, in fact, there is no need for ceramic parts as are found in other brooder heaters. While the top deflector plate 30, being immediately above the burner, is subjected to considerable heat when the burner is operating at its maximum output, it has been found that the plate 30 when made of corrosion-resistant material, e.g., stainless steel or aluminum clad steel will last indefinitely.

In operation, a substantial portion of the heat energy from the burner 44 radiates outwardly from the flames and the perforated housing wall to heat the air space within the brooder. The remainder of the heat energy and the products of combustion rise from the housing and are deflected outwardly by plate 30 so that substantially all of the heat energy is effectively spread throughout the air space within the brooder.

At this point it will be noted (FIG. 1) that a series of vent openings 52 is formed in the roof to permit the safe escape of products of combustion from the burner 44. Holes 52 are equiangularly spaced about the heater unit 10 and are on the same level as, or slightly above the horizontal level of the top deflector plate 30. This arrangement has been found highly effective in obtaining maximum heat use without allowing the products of combustion to create hazardous conditions for the poultry or anyone tending the brooder. As to the number and size of venting openings required in any given installation where the products of combustion are deflected laterally as by the upper plate 30, it has been found by test that for every 3320 B.t.u.'s of rated output, openings equal to one square inch should be made. Thus, for a heater unit rated at 20,000 B.t.u. output six holes of 1 3/16" diameter will suffice to properly vent a brooder.

As described, the thermostatically controlled valve 16 controls the amount of fuel flowing to the burner 44 in accordance with the desired interior temperature of the brooder. It will be noted that with the present non-aerated burner it is possible to operate from an extremely small flame length, practically negligible, up to the maximum length of flame for the rated output of the unit. This wide range of flame length enables the interior heat of the brooder unit to be accurately controlled at all times.

It will be seen that the described heater unit is an extremely compact pre-packaged assembly, tailor made for poultry brooders, and one which requires not only a minimum of effort to install but reduces to an absolute minimum any chance of an improper installation by the user.

Having thus described the invention, what is claimed is:

1. In a poultry brooder, a heater unit assembly comprising an upright cylindrical housing formed of perforated sheet metal, a horizontal top deflector plate formed of corrosion resistant material, bracket means for securing said top plate to and spacing it above said housing, said bracket means having upwardly projecting portions for spacing the top plate from the roof of the brooder, said unit further comprising a spider spanning the interior of said housing adjacent the lower end thereof, a horizontally disposed spiral non-aerated burner supported by said spider and a horizontal bottom deflector plate suspended from and spaced beneath said housing.

2. A gas burner unit of the luminous flame type for heating poultry brooders and the like comprising a cylindrical perforated sheet metal housing open at the top and bottom, a spider secured interiorly to the housing adjacent the bottom opening thereof, a luminous flame non-aerated gas burner tube coiled on and carried by said spider, a depending support carried by said spider having a lower horizontal deflector plate fixed thereby in vertically spaced relation below the bottom edge of said housing, said plate blocking the transfer of radiant heat therebelow and preventing direct access of foreign matter to said lower housing opening, and a thin upper plate mounted on said housing in vertically spaced relation above the upper edge thereof with means for mounting said unit from a support above said upper plate, said perforated housing blocking entry of foreign matter into the interior of the housing and allowing lateral passage of radiant heat from the flames of said non-aerated burner, said upper edge of the housing and said upper plate being above the flame height of said burner and said plate reflecting radiant heat therefrom and deflecting convection currents and the products of combustion laterally and outwardly thereof.

References Cited in the file of this patent

UNITED STATES PATENTS

| | | |
|---|---|---|
| 420,225 | Carrington | Jan. 28, 1890 |
| 653,867 | Inderlied et al. | July 17, 1900 |
| 739,584 | Bucknam | Sept. 22, 1903 |
| 1,042,872 | Best | Oct. 29, 1912 |
| 1,218,206 | Panasevitch | Mar. 6, 1917 |
| 1,279,521 | Dewey | Sept. 24, 1918 |
| 1,530,423 | Sheer | Mar. 17, 1925 |
| 1,573,718 | Kimble | Feb. 16, 1926 |
| 2,132,021 | Forster | Oct. 4, 1938 |
| 2,201,678 | Du Fault | May 21, 1940 |
| 2,240,571 | Olson et al. | May 6, 1941 |

FOREIGN PATENTS

| | | |
|---|---|---|
| 784,419 | Great Britain | Oct. 9, 1957 |